United States Patent [19]

Schwarz et al.

[11] Patent Number: 4,967,868
[45] Date of Patent: Nov. 6, 1990

[54] DRIVE ARRANGEMENT FOR A FOUR WHEEL DRIVE VEHICLE

[75] Inventors: Reinhard Schwarz, Goldelsheim; Heinz Stuhrmann, Schwetzingen; Volker Huckler, Radolfzell; Dieter Nobis, Lonsee-Halzhausen, all of Fed. Rep. of Germany

[73] Assignee: Deere & Company, Moline, Ill.

[21] Appl. No.: 341,282

[22] Filed: Apr. 21, 1989

Related U.S. Application Data

[63] Continuation of Ser. No. 103,765, Oct. 1, 1987, abandoned.

[30] Foreign Application Priority Data

Oct. 1, 1986 [DE] Fed. Rep. of Germany ....... 3633399

[51] Int. Cl.$^5$ .................... B60K 17/34; B60K 41/00
[52] U.S. Cl. .................... 180/233; 180/248
[58] Field of Search ............ 180/248, 249, 197, 233

[56] References Cited

U.S. PATENT DOCUMENTS

| 3,923,113 | 12/1975 | Pagdin | 180/249 |
|---|---|---|---|
| 4,422,349 | 12/1983 | Matsumoto et al. | 180/247 |
| 4,538,700 | 9/1985 | Suzuki | 180/248 |
| 4,669,559 | 6/1987 | Fukui | 180/233 |
| 4,696,365 | 9/1987 | Ishimori et al. | 180/233 |
| 4,727,954 | 3/1988 | Matsumoto | 180/249 |

FOREIGN PATENT DOCUMENTS

| 0168775 | 1/1986 | European Pat. Off. . |
|---|---|---|
| 0182312 | 5/1986 | European Pat. Off. . |
| 3036445 | 6/1981 | Fed. Rep. of Germany . |
| 3408991 | 10/1984 | Fed. Rep. of Germany . |
| 3516982 | 6/1986 | Fed. Rep. of Germany . |
| 3638072 | 11/1987 | Fed. Rep. of Germany . |

Primary Examiner—Mitchell J. Hill

[57] ABSTRACT

A drive arrangement for a four wheel drive vehicle is equipped with a planetary gear set for driving the front wheels which can operate in either direct drive or with a speed increase and which is shifted according to the steering angle $\beta$ sensed at the front pair of wheels. To avoid an excessively high jump in speed during the transition from direct drive to the increased speed mode, the planetary gearset is gradually shifted, i.e., the planetary gear clutch and/or brake are allowed to slip in proportion to the steering angle $\beta$.

11 Claims, 2 Drawing Sheets

DRIVE ARRANGEMENT FOR A FOUR WHEEL DRIVE VEHICLE

This application is a Continuation of application Ser. No. 07/103,765, filed Oct. 1, 1987; now abandoned.

BACKGROUND OF THE INVENTION

1. The present invention relates to a drive arrangement for a four wheel drive vehicle having a steerable axle, in particular, for agricultural tractors.

2. Description of the Related Art

DE-OS No. 3 408 991 provides a two stage drive arrangement with a dual (input side/output side) planetary gear set. The main vehicle transmission drives the planet carrier of the input side planetary. The planet carrier of the output side planetary is connected to the ring gear of the input side planetary, while the ring gear of the output side planetary can be locked to a housing. The sun gears of both planetaries are rigidly connected to an output shaft which leads to the selectively driven wheels of a front axle. In the first transmission stage, the input side planetary is locked, that is, the planet carrier and sun gear of the input side planetary are locked against relative rotation, and direct drive is provided from the main transmission to the input shaft. In the second transmission stage, the ring gear of the output side planetary is locked against rotation, and a speed increase is obtained between the main transmission and input shaft. Shifting between stages is controlled by electromagnetic valves, which in turn are controlled by the steering angle of the wheels provided on the front axle. Automatic shifting to the second stage is initiated when the steering angle is such that the slip or overrun of the front wheels with respect to the rear wheels reaches zero, i.e., when the front wheels are describing a larger steering radius than the rear wheels. Alternatively, the second stage is initiated at low vehicle speeds, and whenever the front wheels have a lower circumference speed than the rear wheels, e.g., during braking.

This known drive arrangement has the disadvantage that after shifting from the first to the second stage, the front wheels have an excessively high increase in overrun, which affects the steering movement and damages the tires and the ground, especially grassy turf.

The problem underlying this invention is seen as providing a drive arrangement which avoids this excessive overrun.

SUMMARY OF THE INVENTION

This problem has been solved according to the present invention by providing a gradual, in particular, a stepless, application of a brake or clutch to the part of the planetary that is to be restrained against rotation, with the frictional force controlled over a selected range of steering angles as a function of the steering angle.

By this means, the rotational speed of the front wheels is equalized with that of the rear wheels in such a way that a controlled degree of overrun, even about 0%. will result. This contributes to optimal stability and also prevents damage to the tires, as well as to the ground traversed by the vehicle.

BRIEF DESCRIPTION OF THE DRAWINGS

The drawings show an example of the arrangement of the invention which is described in greater detail in the following.

DETAILED DESCRIPTION OF THE PREFERRED EMBODIMENTS

Figure 1:
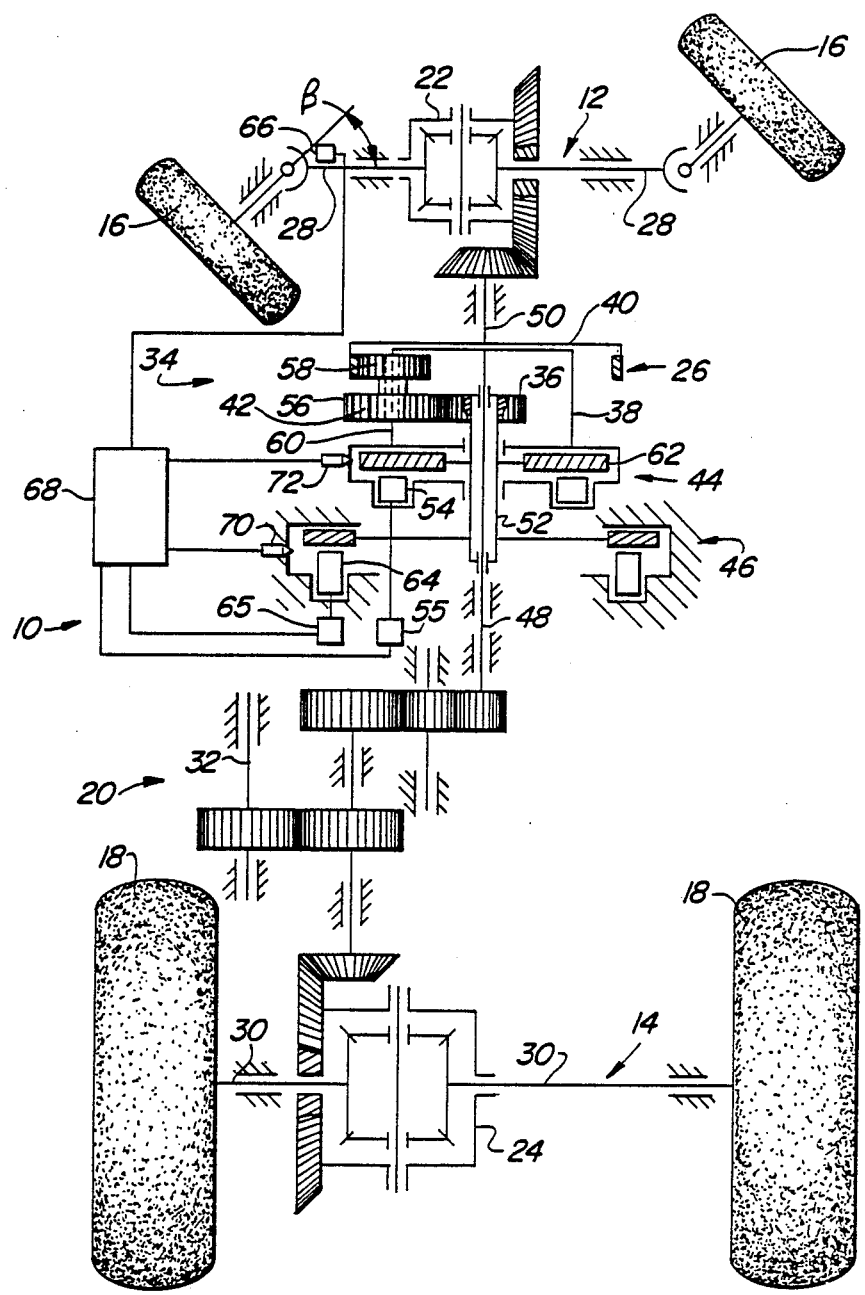
FIG. 1 shows schematically a motor vehicle with a drive arrangement according to the present invention.

A motor vehicle 10 is shown in FIG. 1, which may be an agricultural tractor, and includes a front and a rear axle 12, 14 which are equipped with selectively driven front wheels 16 and continuously driven rear wheels 18, respectively. For the sake of clarity, only the pertinent parts of the motor vehicle 10 are shown. They include a main transmission 20, a front differential 22, a rear differential 24 and a variable speed gear box 26 between the main transmission 20 and the front differential 22.

The front axle 12 is configured as a steerable axle and the front wheels 16 can be pivoted through a steering angle $\beta$ of about 50 degrees maximum, supported in corresponding front wheel bearing supports, not shown. The steering angle $\beta$ is indicated between the axis of rotation of the left front wheel 16 and the longitudinal centerline of the front axle 12. The front axle 12 contains the front differential 22, from which a shaft 28 extends on each side to drive each of the front wheels 16. Otherwise, the front axle 12 may correspond to a conventional front axle for a front wheel drive.

The rear axle 14 is a rigid axle and contains the rear differential gear 24 and shafts 30, which drive the rear wheels 18.

The front and the rear wheels 16, 18 are of conventional configuration and, in this example, the front wheels 16 have a smaller outside diameter than the rear wheels 18.

The differential gears 22, 24 serve to equalize the speeds of the wheels of their respective axles 12, 14 during cornering, and both are equipped with locks, not shown, by means of which their respective pairs of wheels may be locked against rotation relative to each other, as required when operating over ground with varying friction characteristics.

The main transmission 20 may contain any number of gear ratios and be of any of a number of configurations, such as a synchronized mechanically shifted gear box, a drive automatically shifted according to load or a drive employing a torque converter. In the drawing, the main transmission 20 is indicated merely as a mechanically shifted gear box, driven by an engine shaft 32 from an engine, not shown. The drive from the engine to the front and rear differentials 22, 24 is initially taken in all cases through the main transmission 20, which determines the speed of the drive.

A variable speed drive 26 is provided in the drive line between the main transmission 20 and the front differential 22. The variable speed drive 26 contains a planetary gear set 34 with a sun gear 36, a planet carrier 38, a ring gear 40, a number of double planet gears 42, a clutch 44 and a brake 46. The planetary 34 is mounted concentric to an input shaft 48 and an output shaft 50, where the input shaft 48 provides the connection from the main transmission 20 and the output shaft 50 provides the connection to the front differential 22.

The sun gear 36 can be locked by the brake 46 or the clutch 44 by means of a hollow shaft 52 in which the input shaft 48 is guided. Thus, it can either be locked against rotation relative to the motor vehicle 10 or the planet carrier 38, as further described below. In addition, the sun gear 36 is in constant mesh with the planets 42.

The planet carrier 38 is fixed for rotation with the input shaft 48 and supports the planet gears 42, which are free to rotate. A hydraulic piston 54 is integrated into the planet carrier 38, and can be moved between a position in which the clutch 44 is locked to the planet carrier 38, and another position in which the clutch 44 is free to rotate with respect to the planet carrier 38.

The ring gear 40 is bell-shaped and surrounds one stage of the double planet gears 42. The center of the dome of the bell is connected to the output shaft 50, which in turn transmits power to the front differential 22.

The planet gears 42 are designed as double gears and each has a large and a small diameter gear 56, 58 which are fixed for rotation with each other at all times. They are supported by bearings on shafts 60 in the planet carrier 38. The small gear 58 meshes with the ring gear 40, while the large gear 56 is constantly in mesh with the sun gear 36. The planet gears 42 are designed as double gears and the gears 56 and 58 are provided with different outside diameters so as to provide a change in rotational speed, in particular a speed increase. While several planet gears are preferred, it should be understood that a single double planet gear would be adequate.

The clutch 44 preferably is arranged as a disk or a multiplate clutch running in fluid. It includes at least in its outer ring area a friction surface 62 which can be brought into contact with an opposing surface in or on the planet carrier 38 by the hydraulic piston 54. Under normal circumstances, the clutch 44 is loaded so that no relative motion can take place between the clutch 44 and the sun gear 36 to which it is connected. The hydraulic piston 54 can be moved to each of its end positions by fluid pressure, or it may be moved to one end position by fluid pressure and moved to its other end position by spring force, as is common practice. However, if the hydraulic piston 54 is moved into one of its end positions by spring force, the spring force must be great enough to force the hydraulic piston 54 into contact with the planet carrier 38 so as to shift the planetary 34 to direct drive. Regardless of the direction of its movement, control of the hydraulic piston 54 preferably is accomplished by an electrohydraulic valve 55.

The brake 46 also is designed as a disk or multi-plate brake operating in a fluid bath. It is actuated by a hydraulic piston 64 and can be locked against rotation to the motor vehicle 10. The hydraulic piston 64 is actuated by a supply of fluid under pressure, preferably via an electrohydraulic valve 65.

Finally, a control circuit is provided, and includes a sensor 66 to determine the steering angle $\beta$ of the front wheels 16, an electronic control unit 68, a temperature sensor 70 to determine the frictional heat of the brake 46, and the electromagnetic valves 55, 65 which control the clutch 44 and brake 46. This control circuit is designed so that it actuates the clutch 44 and the brake 46 as a function of the steering angle $\beta$ and the temperature at the brake 46. If desired, a similar temperature sensor 72 may be provided at the clutch 44.

It is possible to take precautions to provide for a complete interruption of power to the front wheels 16. This could be provided by a separating clutch in the input shaft 48 or the clutch 44 and the brake 46 could be controlled so that no power would be transmitted through those components or through the planetary 34.

Figure 2:
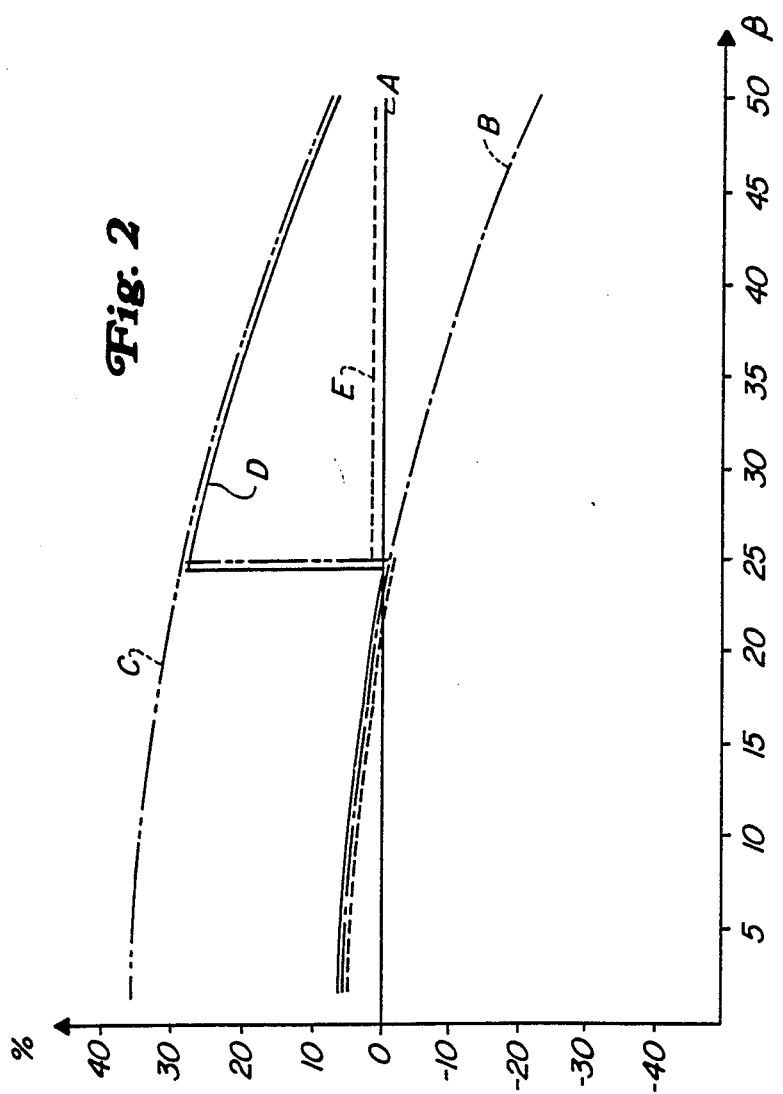
FIG. 2 shows a diagram explaining the results that can be obtained with the drive arrangement of the invention.

Before describing the operation of the planetary 34 and the control circuit, an explanation of FIG. 2 is given. In the diagram in FIG. 2, the ordinate shows the slip of the front wheels 16 relative to the rear wheels 18, while the abscissa shows the steering angle $\beta$.

The values shown in the diagram are based on the assumption that the front wheels 16 are driven at a circumferential speed 7% greater than the rear wheels 18 during straight ahead operation, and that the speed ratio established by the planetary 34 is about 30%.

Line A represents the slip of the front wheels 16 relative to the rear wheels 18 in the ideal case where the circumferential speeds of the front and rear wheels 16 and 18 are identical over the entire range of steering angles $\beta$, i.e., there is no slip.

Curve B represents the relation of the overrun/slip of the front wheels 16 to the steering angle $\beta$ while the front wheels 16 maintain a constant circumferential speed. It can be seen that despite the initial overrun of 7%, the front wheels 16 are rolling at the same speed as the rear wheels 18 at a steering angle $\beta$ as low as about 23 degrees. This means that the average steering radii of the front and the rear wheels 16, 18 are equal at a steering angle of approximately 23 degrees. If the front wheels 16 could not be driven at a greater circumferential speed above a steering angle $\beta$ of 23 degrees, then the curve B would continue as shown. At a steering angle $\beta$ of 50 degrees, an underrun or slip of about minus 23% will result. The results could be damage to the tires on the front wheels 16, possibly damage to the ground covered during cornering and placement of a high torque load on the drive.

A second curve C shows the same relationship, but this time the planetary 34 is shifted to provide a 30% speed increase for the front wheels 16 at the beginning of cornering. For this curve C, no underrun occurs but excessively high overrun does. The excessively high overrun would result in the same problems as the underrun.

A third curve D is formed from the portion of the curve B between 0 degrees and about 23 degrees, and the portion of the curve C from about 23 degrees to 50 degrees. This curve C could be produced by shifting the planetary 34 when the steering angle reaches about 23 degrees. However, it will be seen that at a steering angle $\beta$ immediately above 23 degrees, the overrun, which had decreased to zero, abruptly climbs to 28%, again resulting in the same high overrun problems.

The desired near 0% slip shown by curve E is obtained only by operating according to the present invention, which operation now will be described with reference to FIG. 1.

Power to the front differential gear 22 and hence to the front wheels 16 can be supplied through the planetary 34 via a first stage direct drive, or through a second stage with a speed increase.

For the first stage, the clutch 44 is actuated in such a way that the sun gear 36 and the planet carrier 38 rotate together, so that no relative motion is possible between the small gear 58 of the double planet gear 42 and the ring gear 40. The brake 46 is released and rotates with the sun gear 36, so that power flows directly from the input shaft 48 through the planet carrier 38, the small gear 58, the ring gear 40 and the output shaft 50 to the front differential gear 22.

In this first stage, the relationships of curve B are met between 0 degrees and 23 degrees.

For the second stage, the clutch 44 is released so that the planet carrier 38 can move relative to the sun gear 36. The brake 46 is locked, and with it the sun gear 36, so that the planet gears 42, moved in a circular arc by the planet carrier 38, are rolling on the sun gear 36. By reason of the diameter difference of the small and the large gear 56 and 58, an additional speed change occurs between the small gear 58 and the ring gear 40, which leads to an increase in the speed of the input shaft 48.

According to the present invention, however, the brake 46 is not locked 100% at a steering angle $\beta$ of 23 degrees, but only at that time at which the additional path taken by the front wheels 16 during cornering corresponds to the maximum speed increase in the planetary 34. Instead, the steering angle $\beta$ is monitored constantly and supplied to the electronic control unit which determines at which slip the brake 46 must operate in order to maintain the overrun of the front wheels 16 within required limits, such as about 0%, and considering the effects of the tire size of the front and the rear wheels 16 and 18, the desired overrun of the front wheels 16 and the steering angle $\beta$.

Control of the slip of the brake 46 is such that the relationship shown in curve E will result for steering angles $\beta$ greater than 23 degrees. The clutch 44 may also be controlled in such a way that a partial slip in the first stage is obtained with a resulting overrun of approximately 0% for a steering angle $\beta$ from 0 degrees to 23 degrees.

The aforementioned temperature sensor can be used for the control of the operating temperature at the brake 46 or the clutch 44, as well as a warning device against excessive wear of the brake 46 or the clutch 44.

We claim:

1. A drive arrangement for a tractor, comprising:
   a steerable axle having a first set of drivable wheels thereon;
   a sensor for detecting a steering angle of said steerable axle;
   a driven planetary gear set drivably connected to said wheels and gradually shiftable between a first transmission stage and a second transmission stage by gradually engageable friction elements;
   a second set of drivable wheels;
   control means for gradually engaging and disengaging said friction elements in proportion to the steering angle detected by said sensor so as to gradually shift said planetary gear set between said first and second stages in a pre-determined manner corresponding to said detected steering angle, whereby to maintain a degree of slip between said first and second wheel sets within a predetermined range.

2. The drive arrangement of claim 1, further comprising a temperature sensor for detecting the temperature of said friction elements and wherein said control means shifts said planetary gear set fully into one of said first and second transmission stages when the detected temperature exceeds a predetermined value.

3. The drive arrangement of claim 1, wherein said control means controls the friction elements in direct proportion to the sensed steering angle.

4. The drive arrangement of claim 1, wherein said control means controls the engagement of said friction elements to hold said planetary gear set fully in said first stage when said sensed steering angle is below a predetermined angle and gradually alters the engagement of the friction elements when the steering angle is above said predetermined angle to gradually shift the planetary gear set to said second stage.

5. The drive arrangement of claim 4, wherein said predetermined angle is about 23°.

6. The drive arrangement of claim 1, wherein said first and second sets of wheels comprise the front and rear wheels, respectively, of a work vehicle.

7. The drive arrangement of claim 1, wherein said second stage drives said first wheel set at a higher speed than said first stage.

8. In a tractor having:
   a steerable axis having a first set of drivable wheels therein;
   a second set of drivable wheels; and
   a driven planetary gear set drivably connected to said wheels and shiftable between a first transmission stage and a second transmission stage by means of friction elements;
   the process of controlling said planetary gear set, comprising:
   determining the steerable angle of said steerable axis; and
   adjusting pressure on said friction elements in a predetermined manner corresponding to said steering angle, whereby to shift said planetary gear set between said first stage and said second stage gradually to maintain a degree lip between said first and second wheel sets within a pre-determined range.

9. The process of claim 8 further comprising controlling the friction elements in direct proportion to the sensed steering angle.

10. The process of claim 8, further comprising controlling the engagement of said friction elements to hold said planetary gear set fully in said first stage when said sensed steering angle is below a predetermined angle and gradually altering the engagement of the friction elements when the steering angle is above said predetermined angle to gradually shift the planetary gear set to said second stage.

11. The process of claim 10, wherein said predetermined angle is about 23°.

* * * * *

UNITED STATES PATENT AND TRADEMARK OFFICE
CERTIFICATE OF CORRECTION

PATENT NO. : 4,967,868

DATED : 6 November 1990

INVENTOR(S) : Reinhard Schwarz et al.

It is certified that error appears in the above-identified patent and that said Letters Patent is hereby corrected as shown below:

In Col. 6, line 27, delete "axis" and insert -- axle --.

In Col. 6, line 36, delete "axis" and insert --axle--.

In Col. 6, line 42, delete "degree lip" and insert -- degree of slip --.

Signed and Sealed this

Seventh Day of April, 1992

Attest:

HARRY F. MANBECK, JR.

*Attesting Officer*     *Commissioner of Patents and Trademarks*